Patented Apr. 6, 1954

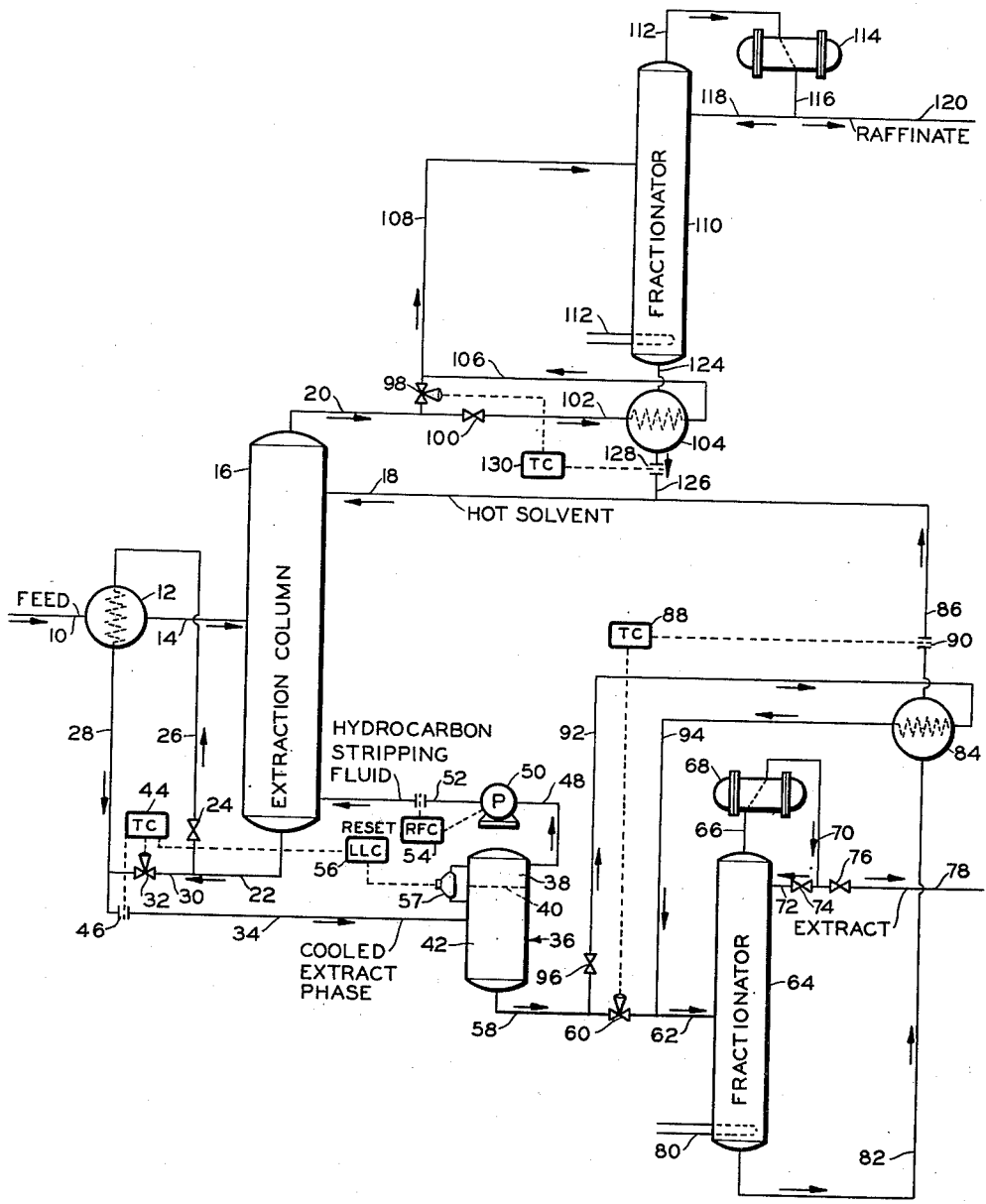

2,674,563

UNITED STATES PATENT OFFICE 2,674,563

LIQUID-LIQUID SOLVENT EXTRACTION PROCESS

Robert A. Findlay, Bartlesville, Okla., assignor to Phillips Petroleum Company, a corporation of Delaware Application January 4, 1950, Serial No. 136,771

6 Claims. (Cl. 196—14.35)

This invention relates to the solvent extraction of liquid hydrocarbon materials with liquid solvents. In some of its preferred aspects the invention relates particularly to the use of materials which are ordinarily viscous, as solvents for separating hydrocarbon materials into fractions of differing characteristics. In one of its preferred embodiments the invention relates to particular methods for controlling solvent extraction and recovery systems of the type described.

It has long been known that hydrocarbon materials, ordinarily liquid mixtures of two or more hydrocarbons of different type, can be separated into two or more fractions of differing characteristics by subjecting the mixture in the liquid phase to contact with certain polar compounds which act as selective solvents. These selective solvents usually have a greater affinity for the more cyclic and/or unsaturated hydrocarbons in a series of hydrocarbons of similar molecular weight. The suitability of various polar compounds or mixtures of same as selective solvent for treating a given hydrocarbon mixture varies greatly depending upon the type of hydrocarbon mixture to be treated and the characteristics of the proposed selective solvent. Thus for a given hydrocarbon mixture, one solvent may be too miscible with the mixture, another may be too nearly immiscible, another may have insufficient selectivity, another may be chemically incompatible with a component of the hydrocarbon mixture, and various other deficiencies may appear which prevent the useful application of particular solvents.

I have now found that materials which have been proposed as selective solvents but have not found practical use due to their high viscosity at ordinary treating temperatures may be employed with success by operating at temperatures considerably above those used in most solvent systems. This is a phenomenon separate from the known fact that certain liquids, such as water, which have no appreciable solvent capacity can be used at elevated temperatures because the solubility of hydrocarbons therein is thus increased. I have found that a remarkable increase in efficiency, usually amounting to several fold, can be attained with a given solvent and hydrocarbon mixture in a given extraction apparatus merely by employing a sufficiently high temperature to reduce the viscosity of the solvent, preferably to below four centipoises, during the extraction operation. A number of solvents can be used in the practice of my invention, but two particular solvents which I prefer for treating hydrocarbon mixtures ranging from light gasoline to gas oil in boiling range, are monoethanolamine and ethylene glycol. My invention, in its more specific aspects, provides a very effective control of the process whereby the solvent is fed to the extraction step at the desired temperature, having already been heated in another portion of the process wherein solvent is separated from hydrocarbons. Temperature control is attained by specific use of certain streams within the process as will be described in detail hereinbelow. One particular feature of the invention provides at all times the exact quantity of hydrocarbon "reflux," "backwash," or "enriching liquid" (synonymous terms) required for introduction into the extraction step.

An object of this invention is to effect the separation of a liquid mixture into its components by treating same with a solvent selective towards at least one of said components.

Another object of the invention is to provide an improved liquid-liquid extraction process for segregating hydrocarbon mixtures into types.

A further object of the invention is to increase the efficiency of extraction severalfold when using a normally viscous solvent.

Yet another object of the invention is to control the proportion of extracted material separated from the extract phase for return to the extraction step as backwash or stripping fluid.

Another object is to supply heat to a selective solvent in such a manner that the heat serves two functions, i. e. separating solvent from extract and effecting extraction at an elevated temperature.

A still further object is to provide an internal control for the temperature of solvent employed cyclically in a liquid-liquid extraction process.

A further object of the invention is to improve the action of monoethanolamine as a selective solvent in the separation of hydrocarbon types.

An additional object of the invention is to improve the action of ethylene glycol as a selective solvent in the separation of hydrocarbon types.

Yet another object is to improve the capacity of a given liquid-liquid extraction system.

Further objects and advantages of the invention will become apparent to those skilled in the art from the accompanying disclosure and discussion.

My invention may be understood in detail by reference to the accompanying drawing, which is a schematic flow sheet showing apparatus and flow of materials therethrough suitable for practicing one embodiment of the invention. Certain essential apparatus elements have been shown in diagrammatic form on the flow sheet, but other additional elements have been omitted as they can readily be supplied by one skilled in the art. It will be appreciated that numerous variations from the exact items of apparatus and the particular process described with reference to the accompanying drawing by way of example, may be made without departing from the scope of the invention in its broader aspects.

In the drawing, a hydrocarbon mixture to be separated is drawn from storage or other source not shown via line 10, is passed through heat exchanger 12 in indirect heat exchange relation with hot extract phase derived as hereinafter described and the thus heated feed is passed via line 14 into extraction column 16 at a point intermediate its ends. My process has wide application, but is most frequently employed in treating hydrocarbon mixtures generally boiling within the gasoline range. For example, a fraction of a highly cracked gasoline having a boiling range of 200 to 250° F. may be used as feed and separated into a highly aromatic extract and a nonaromatic largely paraffinic raffinate, the former being employed as blending agent for aviation gasoline and the latter used in ordinary motor fuel or subjected to catalytic cyclization or other conversion as desired.

The internal structure of extraction column 16 is not shown, as any conventional apparatus now known or developed in the future may be employed so long as it effects intimate contact of solvent with hydrocarbon and permits the ultimate separation of a solvent-rich extract phase and a solvent-poor raffinate phase. Generally, extraction column 16 will be either of the packed tower type or more preferably of the spray type wherein one or more spray nozzles are employed to effect dispersion of one phase into another. One preferred type of column contains packing, and also has a spray nozzle for intimately dispersing hydrocarbon phase into solvent phase.

Into column 16 near its top is introduced a hot stream of solvent via line 18, having a temperature controlled as hereinafter described, which for example may be say 180° F. By way of preferred example the process will be described with particular reference to the use of monoethanolamine as the solvent. Because of the high temperature at which the extraction is effected, the viscosity of the solvent is extremely low and the plate efficiency of extraction column 16 is from four to six times that found when ordinary atmospheric temperature is used. The liquid solvent flows downwardly through the extraction zone, preferably as the continuous phase, in countercurrent contact with an upwardly flowing, preferably dispersed, hydrocarbon phase. The more aromatic constituents of the feed are dissolved in the solvent and passed downwardly therein in the solvent phase, while the more paraffinic constituents remain undissolved and pass upwardly in the hydrocarbon phase. Limited amounts of solvent are also dissolved in the hydrocarbon phase. From the top of extraction column 16 the hydrocarbon phase, ordinarily called the raffinate phase, is removed via line 20. The solvent-rich phase, ordinarily termed the extract phase, is removed from the bottom of column 16 through line 22.

A portion of the extract phase passes through normally-open valve 24 and line 26 to heat exchanger 12 wherein it is partly cooled by contact with incoming feed. The thus cooled extract phase, after being additionally heat exchanged if necessary in means not shown, passes via line 28 to admixture with the remainder of the extract phase which has passed from line 22 through line 30 and motor valve 32 in an uncooled condition, and the reunited extract phase is then passed through line 34 into settler 36. By virtue of the cooling of part of the extract phase in heat exchanger 12, a portion of the dissolved extract hydrocarbons, aromatic in character, separate out from solution in the solvent-rich extract phase as a separate hydrocarbon phase, which accumulates in the top of settler 36 as phase 38. In the drawing numeral 40 represents the interface between this phase 38 and the remaining extract phase 42 in the lower part of settler 36. Motor valve 32 is controlled by temperature controller 44 in response to the temperature of the mixed extract phase stream flowing in line 34 detected by a thermocouple 46. Temperature controller 44 is preset by the operator to give a chosen temperature in line 34 which will effect the separation of the desired proportion of extract as a separate phase 38 in settler 36. This phase is withdrawn through line 48 by pump 50 and passed through line 52 into extraction column 16 near the bottom thereof as a stripping fluid, reflux, or backwash, these terms being used synonymously herein, the function of which is to provide additional rectification within the extraction column 16 and insure a high purity extract relatively free from paraffinic components. Pump 50 is controlled by rate-of-flow controller 54 to give a constant feed of extract liquid through line 52 into the extraction column. A liquid level controller 56 is responsive to float 57 to detect the location of interface 40 between hydrocarbon and extract phases in settler 36. When the proportion of extract hydrocarbon being thrown out of solution by virtue of the aforementioned cooling of extract phase changes due to changes in extraction conditions and/or feed composition, this tends to change the level of interface 40. At this time liquid level control 56 acts to reset temperature controller 44 so that the relative proportions of extract phase passing through line 30 without cooling and line 26 with cooling are changed sufficiently to provide the same quantity of hydrocarbon phase 38 as has previously been chosen and provided.

The extract phase 42 is withdrawn from the bottom of settler 36 and passed via line 58, motor valve 60, and line 62 into a fractionator 64 of conventional design. Fractionator 64 serves to separate the extract hydrocarbons from the solvent. The former, which are lower boiling than the solvent in the case being described, pass overhead as a vapor stream through line 66 and are condensed in condenser 68 as a liquid which flows through line 70 and is then separated into two portions, one being returned through line 72 and valve 74 to the top of the fractionator as reflux and the other being withdrawn through valve 76 and line 78 as the extract product of the process.

Heat is added to the bottom of fractionator 64 to effect the necessary rectification therein by heating coil or other suitable device 80, which may be simply a coil placed within the bottom of the fractionator and heated by means of steam or hot oil passed therethrough or which may constitute a separate kettle or reboiler in a manner well known in the art. The solvent, stripped of its dissolved aromatic hydrocarbons, is withdrawn as a hot kettle product from the bottom of fractionator 64 through line 82 and is thence passed through heat exchanger 84 for adjustment of temperature, additional heat exchange (not shown) if necessary, line 86, and line 18 for return to the top of extraction column 16 at the chosen elevated temperature suitable for effecting the extraction as described. The quantity of heat removed in heat exchanger 84 is controlled by temperature controller 88 which acts in response to a thermocouple 90 in line 86, actuating motor valve 60. The cooled extract phase in line 58 is separated, one portion moving through motor valve 60 and the other portion passing through line 92 to heat exchanger 84 and thence through line 94 to join the undiverted portion in line 62 for passage to fractionator 64. Valve 96 in line 92 is normally open, and motor valve 60 controls the proportion of cooled extract phase which is passed through heat exchanger 84 to bring the hot solvent kettle product to the chosen temperature for use in extraction column 16.

In a manner similar to that described above with respect to the treatment of the extract phase, the raffinate phase withdrawn from the top of column 16 through line 20 is passed partly through motor valve 98 and partly through normally opened valve 100 and line 102 to heat exchanger 104, and thence through line 106 to join the undiverted portion of the raffinate phase for flow together through line 108 into fractionator 110. In fractionator 110 the raffinate hydrocarbons are taken off overhead through line 112, condenser 114 and line 116, part being returned to the top of fractionator 110 as reflux through line 118 and the balance being recovered through line 120 as the raffinate product. Fractionator 110 is heated by kettle heater or reboiler 122, and the relatively small quantity of solvent which is dissolved in the raffinate phase is recovered as a hot bottoms product through line 124. This material passes through heat exchanger 104 wherein it is cooled to the proper temperature (preferably the same as that of the hot solvent in line 86) for use in column 16, this temperature being detected in line 126 by thermocouple 128 which actuates temperature controller 130 which in turn controls motor valve 98. It often happens that the amount of solvent withdrawn in the raffinate phase via line 20 and returned to extractor 16 via lines 126 and 18 is insufficient to make worthwhile the use of temperature controller 130, motor valve 98, and heat exchanger 104 in the manner described. In such case these can be dispersed with as slight variations in the temperature of the solvent being returned to the extraction from the bottom of fractionator 110 will not alter the heat input to extractor 16 enough to cause difficulty in control.

With monoethanolamine and a gasoline fraction, suitable temperatures for carrying out the extraction in column 16 range from 170 to 250° F. Of course sufficient pressure is used to maintain the hydrocarbons (and solvent) in liquid phase. At these temperatures, the solubility of the hydrocarbons in the solvent is increased considerably over that at normal atmospheric temperatures and yet the temperature of complete miscibility is not attained. While some decrease in selectivity is encountered because of the increased temperature, this is more than offset by the much greater plate efficiency of extraction column 16 attained by virtue of the low viscosity of the solvent at the elevated temperatures. Because of the increased extraction efficiency, as well as the increased hydrocarbon solubility, the throughput of an extraction column 16 of any given size is considerably increased with consequent savings in plant investment which would be required for a larger extraction apparatus.

While preferred temperatures have been mentioned for certain systems, those skilled in the art having been given the present disclosure will appreciate that optimum temperature will depend on the particular solvent employed and the particular hydrocarbon mixture to be separated. In any event, the temperature should be sufficiently high that the solvent viscosity will be low, much preferably below four centipoises. Flow rates will depend greatly on the extraction apparatus. As indicated above and shown by the data below, my invention permits the use of greatly increased flow rates in a given extraction system. While monoethanolamine and ethylene glycol are my preferred solvents, other selective solvents can be employed, and the invention is particularly applicable to those solvents which are, at usual conditions of operation, too viscous for efficient operation of extraction equipment. The process of my invention in its various embodiments can be applied to a large variety of hydrocarbon mixtures containing hydrocarbons of varying degree of saturation which are to be separated. Such mixtures are preferably normally liquid, ranging from $C_5$ up through the gas oil boiling range.

In demonstrating the effect of viscosity of an extractive solvent on extraction column performance, the following data were obtained with the system monoethanolamine-cyclohexane-n-heptane, at 100° F. and at 170° F. An unpacked column having a 2-inch inside diameter was used, the solvent being introduced near the top and the hydrocarbon feed, composed of 51-57 weight per cent cyclohexane and 49-43 weight per cent n-heptane, was introduced near the bottom through a spray tip. Solvent phase was withdrawn from the bottom. A hydrocarbon-solvent interface was maintained in the column above the point of solvent introduction; and hydrocarbon phase was withdrawn continuously from the top as the raffinate phase. The effective height of the column was the distance from the spray tip to the interface. In order to simulate conditions in the central portion of a column having sufficient stages to obtain complete separation, the solvent introduced was first saturated with hydrocarbon rich in n-heptane, thus representing the composition of the solvent that would be coming down the column at a point a few stages below the top. The hydrocarbon feed was not presaturated with solvent since the amount of solvent dissolved in the hydrocarbon is small, and since the ratio of solvent feed to hydrocarbon feed was high. It will also be noted that no reflux of pure cyclohexane, which would be the extract in a column having sufficient stages for complete separation, was supplied to the bottom of the column. The data below represent conditions obtaining in an extraction column between the point of hydrocarbon feed and a point a few stages below the top of the column where the raffinate has not yet reached its maximum purity; but do not reflect the increased separation obtainable with reflux.

The following data show over double the column throughput at the conditions of solvent viscosity below 4 centipoises, as well as increased extraction separation.

System: Monoethanolamine-cyclohexane-n-heptane.
Phase Dispersed: Hydrocarbon dispersed through 0.0138 inch diameter tip.
Column: 2-inch I. D. unpacked.
Effective Height: 8.8 feet.
SF: Solvent feed.
HCF: Hydrocarbon feed.
EXT: Extract phase.
RAFF: Raffinate phase.

| Run | Solvent Rate lb./hr. | Percent Flood Rate | Flow Ratio lb. SF/lb. HCF | Concentrations | | | | | | Percent Yield Extract |
|---|---|---|---|---|---|---|---|---|---|---|
| | | | | Wt. Percent Cyclohexane, Solvent-Free Basis | | | | Hydrocarbon In Solvent, Wt. Percent | | Solvent in Raffinate, Weight Percent |
| | | | | SF | EXT | HCF | RAFF | SF | EXT | |
| Temperature, 170° F.; Solvent Viscosity, 3.6 centistokes or 3.5 centipoises: | | | | | | | | | | |
| 1 | 50.0 | | 26.1 | 19.0 | 64.0 | 51.0 | 36.5 | 0.49 | 1.37 | 0.2 | 39.2 |
| 2 | 50.3 | | 26.2 | 19.0 | 64.2 | 51.0 | 36.3 | 0.49 | 1.37 | 0.3 | |
| 3 | 64.4 | | 27.0 | 19.0 | 66.1 | 51.0 | 34.1 | 0.49 | 1.58 | 0.2 | |
| 4 | 63.4 | | 26.6 | 19.0 | 66.1 | 51.0 | 34.1 | 0.49 | 1.53 | 0.4 | |
| Temperature, 100° F.; Solvent Viscosity, 11.0 centistokes, or 11.1 centiposes: | | | | | | | | | | | 15.4 |
| 5 | 13.8 | 50 | 12.0 | 19.6 | 57.7 | 51.7 | 49.0 | 0.37 | 0.57 | | |
| 6 | 19.8 | 72 | 11.8 | 20.8 | 55.7 | 51.7 | 49.8 | 0.39 | 0.59 | | |
| 7 | 24.6 | 90 | 12.0 | 18.4 | 59.0 | 51.8 | 49.6 | 0.35 | 0.63 | | |
| 8* | 27.5 | 100 | | | | | | | | | |
| 9 | 24.6 | 90 | 26.0 | 18.4 | 50.7 | 51.8 | 48.9 | 0.35 | | | |

*Column floods at flow rates above 27.5 lb. solvent/hr.

While the invention has been described in detail with respect to various preferred embodiments, those skilled in the art will appreciate that modifications and variations can be made in the exact details disclosed without departing from the invention. By way of example, in a few instances wherein an exceptionally pure extract is desired, it may be desirable to provide an additional quantity of reflux over that provided from settler 36; this can readily be done by passing a portion of the extract from line 78 into the bottom of extractor 16, either at a constant flow rate or at a rate maintained at a constant ratio to the rate of flow of liquid in line 48. This and other additions and/or modifications can be made within the scope of the invention.

I claim:

1. An improved process for effecting liquid-liquid solvent extraction with relatively viscous solvents which comprises intimately contacting such a solvent at a temperature sufficiently elevated to give a solvent viscosity of not above four centipoises with a hydrocarbon mixture containing components of differing solubility in said solvent, at sufficient pressure to maintain the solvent and hydrocarbons in liquid phase, withdrawing a solvent-poor raffinate phase from said contacting, withdrawing a solvent-rich extract phase from said contacting, passing a portion of said extract phase in heat exchange with cold hydrocarbon mixture passed to said contacting, passing the remaining portion of said extract phase into admixture with thus cooled extract phase and effecting separation of a resulting solvent enriched extract phase from a liquid hydrocarbon phase comprising extract hydrocarbons thrown out of solution by said cooling, returning the thus separated extract hydrocarbon phase to the said contacting as reflux at a constant rate of flow, controlling the relative proportions of extract phase cooled by said heat exchange and not cooled by said heat exchange to produce a mixture of same having a constant temperature, whenever the quantity of separated extract phase thrown out of solution changes altering said constant temperature to maintain said quantity unchanged, passing the aforesaid solvent enriched extract phase settled from said extract hydrocarbon phase partly to a fractional distillation zone and partly to a heat exchange step hereinafter described, withdrawing extract hydrocarbons from the top of said fractional distillation zone and returning part of same to the top as reflux and recovering the remainder as extract product of the process, heating the bottom of said fractional distillation zone to effect stripping of extract hydrocarbons from solvent therein and to produce a hot solvent bottoms product, passing the latter to said heat exchange step for heat exchange with the aforesaid portion of solvent enriched extract phase, controlling the relative proportions of said extract phase (a) passed to said heat exchange step and thence to said fractionator and (b) passed direct to said fractionator without heat exchange, to cool said hot solvent to a constant temperature for introduction into said extraction step, and recovering from said raffinate phase raffinate hydrocarbons as a product of the process.

2. A process according to claim 1 wherein said solvent poor raffinate phase is passed to different but corresponding fractional distillation zone and heat exchange step and wherein the resulting hot solvent is correspondingly cooled to the same constant temperature by controlling the relative proportions (2) and (b) of said raffinate phase.

3. A process according to claim 1 wherein said solvent is monoethanolamine.

4. A process according to claim 1 wherein said solvent is ethylene glycol.

5. A process according to claim 1 wherein said solvent is monoethanolamine and said extraction is effected at a temperature within the range of 170 to 250° F.

6. An improved process for effecting liquid-liquid solvent extraction with relatively viscous solvents which comprises intimately contacting such a solvent at a temperature sufficiently elevated to give a solvent viscosity of not above four centipoises with a hydrocarbon mixture containing components of differing solubility in said solvent, at sufficient pressure to maintain the solvent and hydrocarbons in liquid phase, withdrawing a solvent-poor raffinate phase from said contacting, withdrawing a solvent-rich extract phase from said contacting, passing a portion of said extract phase in heat exchange with cold hydrocarbon mixture passed to said contacting, passing the remaining portion of said extract phase into admixture with thus cooled extract phase and effecting separation of a resulting solvent enriched extract phase from a liquid hydrocarbon phase comprising extract hydrocarbons thrown out of solution by said cooling, returning the thus separated extract hydrocarbon phase to the said contacting as reflux at a constant rate of flow, controlling the relative proportions of extract phase cooled by said heat exchange and not cooled by said heat exchange to produce a mixture of same having a constant temperature, whenever the quantity of separated extract phase thrown out of solution changes altering said constant temperature to maintain said quantity unchanged.

References Cited in the file of this patent

UNITED STATES PATENTS

| Number | Name | Date |
|---|---|---|
| 1,776,550 | Clark et al. | Sept. 23, 1930 |
| 2,246,297 | Duncan et al. | June 17, 1941 |
| 2,337,732 | Burk et al. | Dec. 28, 1943 |
| 2,400,802 | Arnold | May 21, 1946 |

OTHER REFERENCES

Kalichevsky: "Modern Methods of Refining Lubricating Oils," Reinhold Publishing Co. (1938), pages 116, 121.